(12) United States Patent
Baumberg

(10) Patent No.: US 7,561,164 B2
(45) Date of Patent: Jul. 14, 2009

(54) TEXTURE MAP EDITING

(75) Inventor: Adam Michael Baumberg, Berkshire (GB)

(73) Assignee: Canon Europa N.V., Amstelveen (NL)

( * ) Notice: Subject to any disclaimer, the term of this patent is extended or adjusted under 35 U.S.C. 154(b) by 0 days.

(21) Appl. No.: 10/373,011

(22) Filed: Feb. 26, 2003

(65) Prior Publication Data
US 2003/0160785 A1    Aug. 28, 2003

(30) Foreign Application Priority Data
Feb. 28, 2002   (GB)   .................. 0204749.6
Feb. 28, 2002   (GB)   .................. 0204750.4

(51) Int. Cl.
*G09G 5/00* (2006.01)
(52) U.S. Cl. .................................... 345/582
(58) Field of Classification Search ......... 345/582–588, 345/419, 630, 639, 640
See application file for complete search history.

(56) References Cited

U.S. PATENT DOCUMENTS

| | | | | |
|---|---|---|---|---|
| 5,363,483 A * | 11/1994 | Jones et al. | ............ | 345/766 |
| 5,977,982 A * | 11/1999 | Lauzon | ............ | 345/582 |
| 5,977,983 A * | 11/1999 | Einkauf et al. | ............ | 345/582 |
| 6,081,273 A | 6/2000 | Weng et al. | ............ | 345/425 |
| 6,256,040 B1 | 7/2001 | Tanaka et al. | ............ | 345/421 |
| 6,271,858 B1 * | 8/2001 | Dalal et al. | ............ | 345/582 |
| 6,281,904 B1 | 8/2001 | Reinhardt et al. | ............ | 345/430 |
| 6,297,834 B1 * | 10/2001 | Malzbender | ............ | 345/586 |
| 6,621,921 B1 | 9/2003 | Matsugu et al. | ............ | 382/154 |
| 2001/0056308 A1 | 12/2001 | Petrov et al. | ............ | 700/98 |
| 2002/0050988 A1 | 5/2002 | Petrov et al. | ............ | 345/418 |
| 2002/0061130 A1 | 5/2002 | Kirk et al. | ............ | 382/154 |

(Continued)

FOREIGN PATENT DOCUMENTS

EP    0898245 A1    2/1999

(Continued)

OTHER PUBLICATIONS

Foley et al., "Computer Graphics Principles and Practice," Addison-Wesley Publishing Company, Second Edition, Section 16.3.2, pp. 741-744 (1997).

(Continued)

*Primary Examiner*—Kee M Tung
*Assistant Examiner*—Aaron M Richer
(74) *Attorney, Agent, or Firm*—Fitzpatrick, Cella, Harper & Scinto

(57) ABSTRACT

In order to edit texture data for a 3D computer model, an image showing the 3D computer model with the texture data applied thereto is generated from a user-selected viewing direction and displayed to the user. Changes are made to the image data in accordance with user instructions. Corresponding changes are made to the texture data. To preserve texture data that the user did not wish to change and to retain the quality of the original texture data, processing is performed to amend the texture data which corresponds to only the image data that was changed and not texture data which corresponds to image data unchanged by the user. In addition, processing is performed to identify each polygon in the 3D computer model which is at an oblique angle to the viewing direction of the image displayed to the user. The identified polygons are then excluded from subsequent processing so that the texture data therefor is not changed.

27 Claims, 10 Drawing Sheets

U.S. PATENT DOCUMENTS

| | | | |
|---|---|---|---|
| 2002/0085748 A1 | 7/2002 | Baumberg | 382/154 |
| 2002/0154132 A1* | 10/2002 | Dumesny et al. | 345/582 |
| 2002/0186216 A1 | 12/2002 | Baumberg et al. | 345/422 |
| 2002/0190982 A1 | 12/2002 | Kotcheff et al. | 345/420 |
| 2003/0001837 A1 | 1/2003 | Baumberg | 345/419 |
| 2003/0085891 A1 | 5/2003 | Lyons et al. | 345/420 |

FOREIGN PATENT DOCUMENTS

| | | |
|---|---|---|
| GB | 2358307 A | 7/2001 |
| GB | 2369260 A | 5/2002 |
| GB | 2369541 A | 5/2002 |
| JP | 9-170914 | 6/1997 |
| JP | 11-328441 A | 11/1999 |
| JP | 2000-163590 | 6/2000 |
| JP | 2000-268189 A | 9/2000 |
| JP | 2000-339499 | 12/2000 |
| WO | WO 98/18117 | 4/1998 |
| WO | WO 00/04506 | 1/2000 |
| WO | WO 01/39124 A2 | 5/2001 |

OTHER PUBLICATIONS

Sloan et al., "Importance Driven Texture Coordinate Optimization," Eurographics '98, vol. 17, No. 3 (1998).

Wolfgang Niem et al., "Automatic Reconstruction of 3D Objects Using a Mobile Monoscopic Camera." Image and Vision Computing 17, pp. 173-180. (1999).

Peter J. Burt et al., "A Multiresolution Spline with Application to Image Mosaics." ACM Transactions on Graphics (TOG), vol. 2, No. 4, pp. 217-236 (Oct. 1983).

Paul E. Debevec et al., "Modeling and Rendering Architecture from Photographs: A Hybrid Geometry—and Image-Based Approach." In Conference Proceedings ACM Siggraph, pp. 11-20 (1996).

Frédéric Pighin et al., "Synthesizing Realistic Facial Expressions from Photographs." Proceedings of the 25$^{th}$ Annual Conference on Computer Graphics, pp. 1-10 (Jul. 1998).

Fausto Bernardini et al., "High-Quality Texture Reconstruction from Multiple Scans." IEEE Transactions on Visualization and Computer Graphics, vol. 7, No. 4, pp. 318-332 (Oct.-Dec. 2001).

Eyal Ofek et al., "Multiresolution Textures from Image Sequences." IEEE Computer Graphics and Applications, vol. 17, No. 2, pp. 18-29 (Mar. 1997).

Igor Guskov et al., "Multiresolution Signal Processing for Meshes." In Conference Proceedings ACM Siggraph, pp. 325-334 (1999).

Matthias Eck et al., "Multiresolution Analysis of Arbitrary Meshes." In Conference Proceedings ACM Siggraph, pp. 173-182 (1995).

Pedro V. Sander et al., "Texture Mapping Progressive Meshes." In Conference Proceedings ACM Siggraph, pp. 409-423 (Aug. 2001).

Makoto Maruya, "Generating a Texture Map from Object-Surface Texture Data." Computer Graphics Forum, vol. 14, No. 3, pp. 397-405 (1995).

Maneesh Agrawala et al., "Efficient Image-Based Methods for Rendering Soft Shadows." Proceedings of Siggraph 2000, Computer Graphics Proceedings, Annual Conference Series, pp. 375-384 (Jul. 2000).

Yizhou Yu., "Efficient Visibility Processing for Projective Texture Mapping." Computer & Graphics, vol. 23, pp. 245-253 (1999).

Reinhard Koch et al., "Multi Viewpoint Stereo from Uncalibrated Video Sequences." ECCV '98, vol. 1, pp. 55-71 (Jun. 1998).

C. Rocchini et al., "Multiple Textures Stitching and Blending on 3D Objects." Eurographics Rendering Workshop, (Jun. 1999).

Hendrik P. Z. Lensch, "A Silhouette-Based Algorithm for Texture Registration and Stitching." Graphical Models, vol. 63, No. 4, pp. 245-262 (2001).

Wojciech Matusik et al., "Image-Based Visual Hulls." Proceedings of Siggraph 2000, pp. 369-374 (2000).

Dan Piponi et al., "Seamless Texture Mapping of Subdivision Surfaces by Model Pelting and Texture Blending." Proceeding of Siggraph 2000, pp. 471-478 (Jul. 2000).

Martin Lohlein, "A Volumetric Intersection Algorithm for 3d-Reconstruction Using a Boundary-Representation", http://i31www.ira.uka.de/diplomarbeiten/da_martin_loehlein/Reconstruction.html.

M. Szilvasi-Nagy, "An Algorithm for Determining the Intersection of Two Simple Polyhedra", Computer Graphics Forum 3 (1984), pp. 219-225.

R. I. Hartley, "Euclidean Reconstruction From Uncalibrated Views", Applications of Invariance in Computer Vision, Mundy, Zisserman and Forsyth eds., Azores 1993, pp. 237-256.

J. Illingworth & A. Hilton, "Looking to build a model world-automatic construction of static object models using computer vision", Electronics & Communication Engineering Journal, Jun. 1998, pp. 103-113.

Steven J. Gortier et al., "The Lumigraph", Computer Graphics Proceedings, Annual Conf. Series, 1996 ACM-0-89791-746-4/96/008, pp. 43-52.

Peter J. Neugebauer & Konrad Klein, "Texturing 3D Models of Real World Objects from Multiple Unregistered Photographic Views", Eurographics '99, vol. 18 (1999), No. 3.

Greg Turk & Marc Levoy, "Zippered Polygon Meshes from Range Images", Computer Graphics Proceedins, Annual Conference Series, 1994, ACM Siggraph, pp. 311-318, ISBN 0-89791-667-0.

P. Hanrahan, et al., "Direct WYSIWYG Painting and Texturing on 3D Shapes", Computer Graphics, vol. 24, No. 4, pp. 215-223 (Aug. 1990).

A. Watt, "3-D Computer Graphics", pp. 260-262 (2000).

* cited by examiner

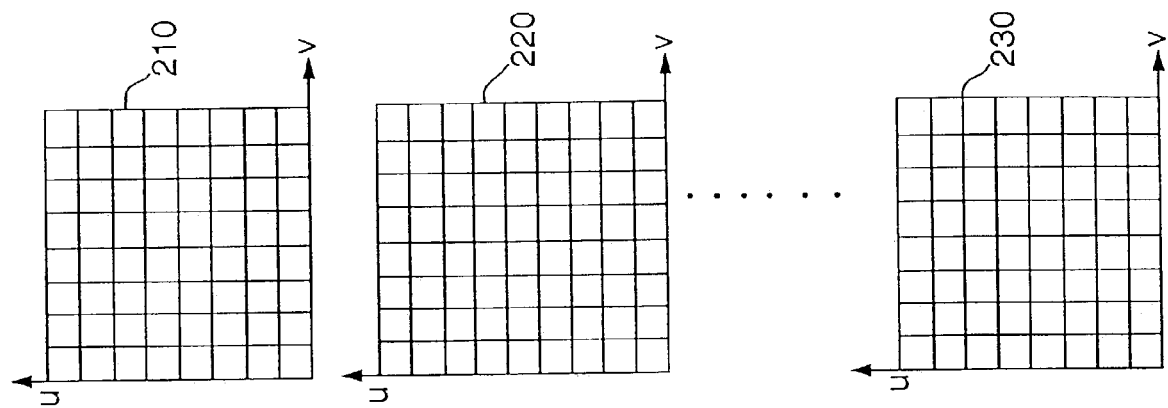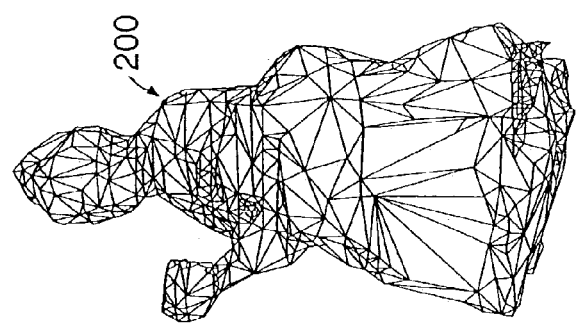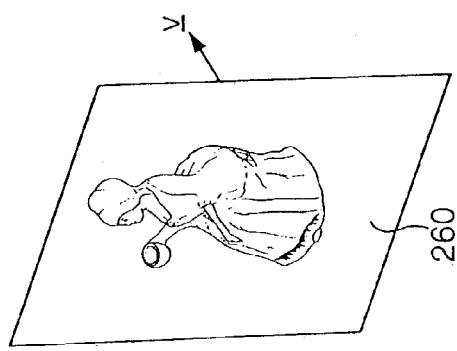
Fig.5.

TEXTURE MAP EDITING

This application claims the right of priority under 35 USC §119 based on British patent applications 0204750.4 filed Feb. 28, 2002 and 0204749.6 filed Feb. 28, 2002, which are hereby incorporated by reference herein in their entirety as if fully set forth herein.

The present invention relates to the field of three-dimensional (3D) computer graphics, and more particularly to texture mapping and the editing of texture map data.

Texture mapping, in which image data (either "real" image data recorded by a camera or synthesized image data) is mapped onto a surface of a 3D computer model so that the image data appears as surface detail in images of the computer model, is widely known and used. For example, the technique is described in "Computer Graphics Principles and Practice" by Foley, van Dam, Feiner and Hughes, Addison-Wesley Publishing Company, Second Edition, Section 16.3.2, 1997, ISBN 0201848406.

Traditionally, to change the image data to be mapped onto the 3D computer model, the texture map data must be accessed, displayed and changed. However, the effect of the changes cannot be seen until the changed texture map data is applied to the surface of the 3D computer model and one or more images of the 3D computer model are generated and viewed. Accordingly, changing the texture map data in a desired way can be difficult and time-consuming.

The present invention has been made with these problems in mind.

According to the present invention, texture data for a 3D computer model is edited not by viewing and changing the texture data, but instead by viewing and changing an image generated in accordance with user-selected viewing conditions and showing the 3D computer model with the texture data applied. Changes made to the image data are used to make changes to the corresponding texture data. In this way, the user can view the effect of the texture data on the 3D computer model to determine which texture data needs to be changed, has control to generate an image showing the best view of the texture data to be changed, and can view the effect any changes made to the texture data have on the 3D computer model in real-time.

Texture data in more than one texture map may be changed in response to user amendments of a single rendered image of the 3D computer model.

The image data may be exported for editing from the application in which the image data was generated in accordance with the user instructions into a separate application for editing two-dimensional image data. In this way, the user can edit the image data in any chosen editing application and in particular, one with which he is familiar so that he does not have to learn the functions and interface of a different editing application. After editing, the image data may be exported back into the original application so that it can be used to amend the texture data.

Instead of changing the texture data corresponding to all of the image data displayed to the user after it has been amended, processing may be performed to amend the texture data which corresponds to only the image data that was changed (and not texture data which corresponds to image data unchanged by the user). In this way, the texture data that the user did not wish to change is preserved, retaining the quality of the texture data and thereby the quality of subsequently generated images of the 3D computer model.

Processing may be performed to amend the texture data for only some of the polygons in the 3D computer model. For example, processing may be performed to identify each polygon which is at an oblique angle to the viewing direction of the image displayed to the user to enable him to edit the image data. The identified polygons are then excluded so that the texture data therefor is not changed.

By way of explanation, a polygon which lies at an oblique angle relative to the viewing direction of the image will project into the image to have a relatively small size and hence occupy a relatively small number of pixels when displayed to the user. Because the number of pixels is small, those pixels may be inadvertently edited by the user. However, any changes made by the user to the pixels may affect the texture data for the whole of the polygon. Consequently, the changes may effect a large image area when an image is generated from a different viewing direction.

Accordingly, by preventing the amendment of texture data for oblique polygons, changes to the texture data caused by inadvertent editing of the image data are avoided, and the quality of the texture data is preserved.

The present invention also provides a computer program product for configuring a programmable apparatus to operate in the way described above.

Embodiments of the present invention will now be described, by way of example only, with reference to the accompanying drawings, in which like reference numbers are used to designate like parts, and in which:

FIG. 1 schematically shows the components of an embodiment of the invention, together with the notional functional processing units into which the processing apparatus component may be thought of as being configured when programmed by programming instructions;

FIG. 2 shows an example of a 3D computer model and texture maps defined by the data stored in the apparatus in FIG. 1, and illustrates how texture data maps onto a polygon in the 3D computer model;

FIG. 3 schematically shows the notional functional processing units into which the 3D model and texture map processor component in FIG. 1 may be thought of as been configured;

FIGS. 4*a* and 4*b* show the processing operations performed by the processing apparatus in FIG. 1;

FIG. 5 illustrates the generation and display of image data at step S4-2 in FIG. 4;

Figure 1:
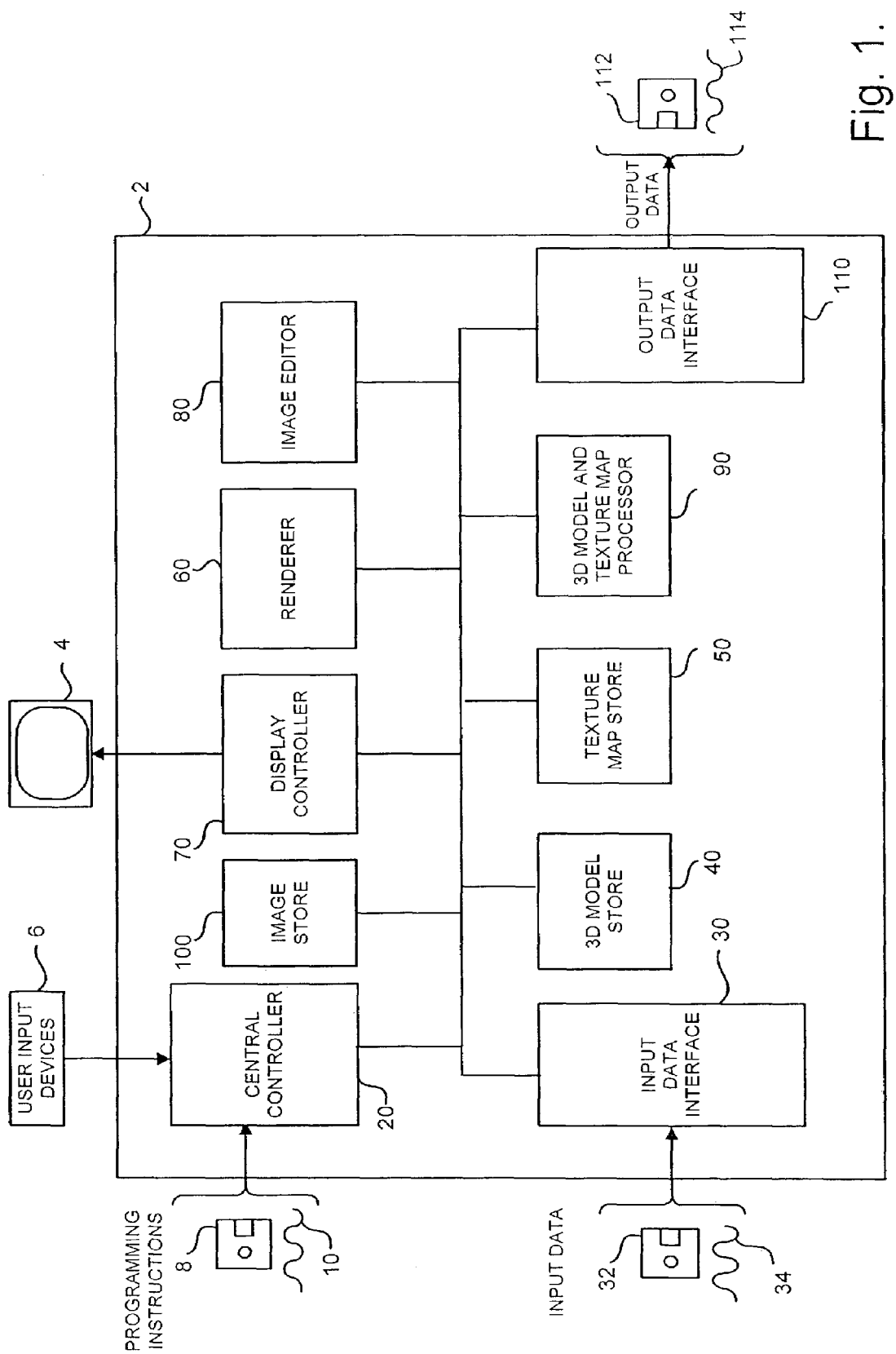

Referring to FIG. 1, an embodiment of the invention comprises a processing apparatus 2, such as a personal computer, containing, in a conventional manner, one or more processors, memories, graphics cards etc, together with a display device 4, such as a conventional personal computer monitor, and user input devices 6, such as a keyboard, mouse, touchpad, tracker ball etc.

The processing apparatus 2 is programmed to operate in accordance with programming instructions input, for example, as data stored on a data storage medium, such as disk 8 and/or as a signal 10 input to the processing apparatus 2, for example from a remote database, by transmission over a communication network (not shown) such as the Internet or by transmission through the atmosphere, and/or entered by a user via a user input device 6 such as a keyboard.

As will be described in more detail below, the programming instructions comprise instructions to cause the processing apparatus 2 to become configured to process data defining a 3D computer model and texture map data therefor, to generate an image of the 3D computer model in accordance with user-selected viewing conditions, and then to change the texture map data in dependence upon changes to the image data made by the user. As will be explained in detailed below, to preserve the original quality of the texture map data, processing is performed to ensure that parts of the texture map are changed if they correspond to the image data which the user has modified, but that parts of the texture map which do not correspond to changed image data are not changed. In this embodiment, this is achieved by storing a copy of the image of the 3D computer model to be edited by the user, comparing the stored copy image with the changed image after it has been edited by the user, and applying the differences between the two images (representing the changed image data) to the texture map data.

In addition, in this embodiment, processing is carried out to determine whether image data edited by the user relates to a polygon in the 3D computer model which is only obliquely visible from the viewing direction of the edited image. If this is the case, then the edited image data is not used to change the texture map data for the polygon. This is because an obliquely visible polygon will map onto only a relatively small number of pixels in the image being edited by the user, and accordingly any changes to those pixels may affect large areas of the polygon. Such changes to the pixels could be caused by unintentional editing of the image data by the user (because only a small number of pixels are involved). Accordingly, the texture data for only sufficiently front-facing polygons is changed, and not the texture data for polygons at an oblique angle.

By performing the processing outlined above, the user can change the texture data readily and reliably without unwanted changes being propagated into the texture data.

When programmed by the programming instructions, processing apparatus 2 can be thought of as being configured as a number of functional units for performing processing operations.

Examples of such functional units and their interconnections are shown in FIG. 1. The units and interconnections illustrated in FIG. 1 are, however, notional and are shown for illustration purposes only to assist understanding; they do not necessarily represent units and connections into which the processor(s), memory etc of the processing apparatus 2 actually become configured.

Referring to the functional units shown in FIG. 1, a central controller 20 is arranged to process inputs from the user input devices 6 and to provide control and processing for the other functional units.

Input data interface 30 is arranged to control the storage of data input to the processing apparatus 2 on a data storage medium, such as disk 32, or as a signal 34.

3D model store 40 is configured to store input data defining a 3D computer model of one or more objects.

Texture map store 50 is configured to store input data defining one or more texture maps for the 3D computer model(s) stored in 3D model store 40.

Figure 2:
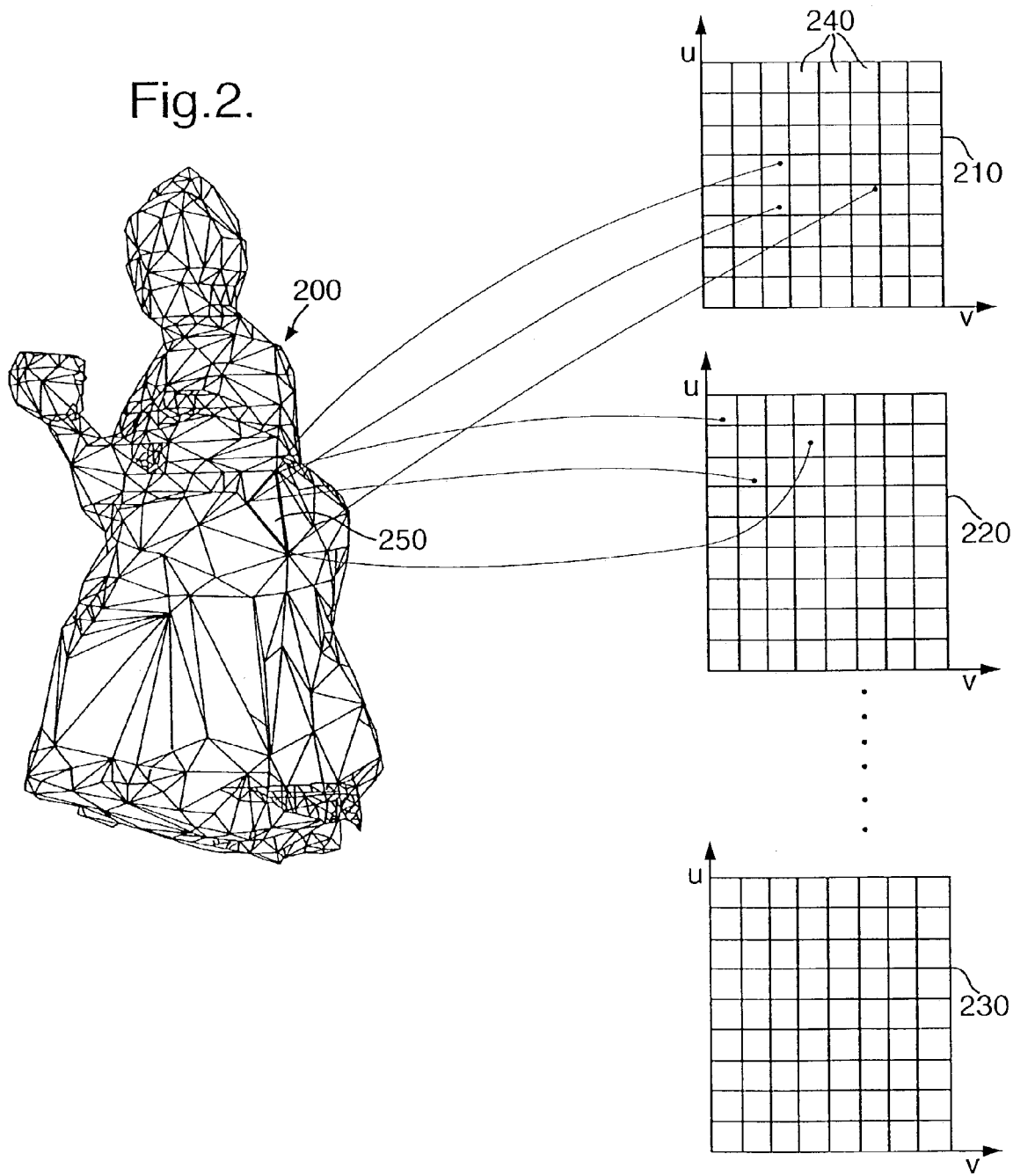

Referring to FIG. 2, by way of example, the data stored in 3D model store 40 defines a polygon mesh 200 representing the surface of a 3D object. In this embodiment, each polygon in the mesh 200 is a planar triangle.

The data stored in texture map store 50 defines a plurality of texture maps, of which three, 210, 220 and 230, are shown in FIG. 2. In a conventional manner, each texture map comprises image data (either real or synthetic) made up of a plurality of texels 240 defined in (u,v) texture coordinate space (in the same way that an image is made up of a plurality of pixels in image space). Alternatively, as is well-known, the texture data in a texture map 210, 220 and 230 may be defined by a procedure which generates the data.

For each polygon in the polygon mesh 200, texture map coordinates in one or more of the texture maps 210, 220, 230 are assigned to the vertices of the polygon. This is illustrated for polygon 250 in FIG. 2 (for which, by way of example, texture map coordinates are defined in two of the texture maps 210, 220).

Referring again to FIG. 1, renderer 60 is arranged to generate an image of the 3D computer model 200 from a viewing direction relative thereto defined by a user using a user input device 6. In this processing, the values of the pixels in the image data are generated in dependence upon texture data from the texture maps 210, 220, 230 mapped onto the pixels in dependence upon the viewing parameters. The processing performed by renderer 60 is conventional and accordingly will not be described here.

Display controller 70, under the control of central controller 20, is arranged to display image data generated by renderer 60 and instructions to the user via display device 4 during the processing by processing apparatus 2.

Image editor 80 is arranged to edit image data generated by renderer 60 in accordance with instructions input by a user using one or more user input devices 6 while the user views the image on display device 4 and the changes as they are made thereto. In this embodiment, image editor 80 is defined by a software application running on processing apparatus 2 which is separate from the application(s) and operating system defining the other functional components shown in FIG. 1. Thus, for example, image editor 80 may be defined by a software application such as Adobe Photo-Shop$^{RTM}$ or the like.

3D model and texture map processor 90 is arranged to perform processing to change the texture map data stored in texture map store 50 in accordance with the changes made by image editor 80 to the image data generated by renderer 60.

Image store 100 is configured to store a copy of the original data generated by renderer 60 (that is, the data before any changes are made thereto by the user) for use in the processing by 3D model and texture map processor 90.

Figure 3:
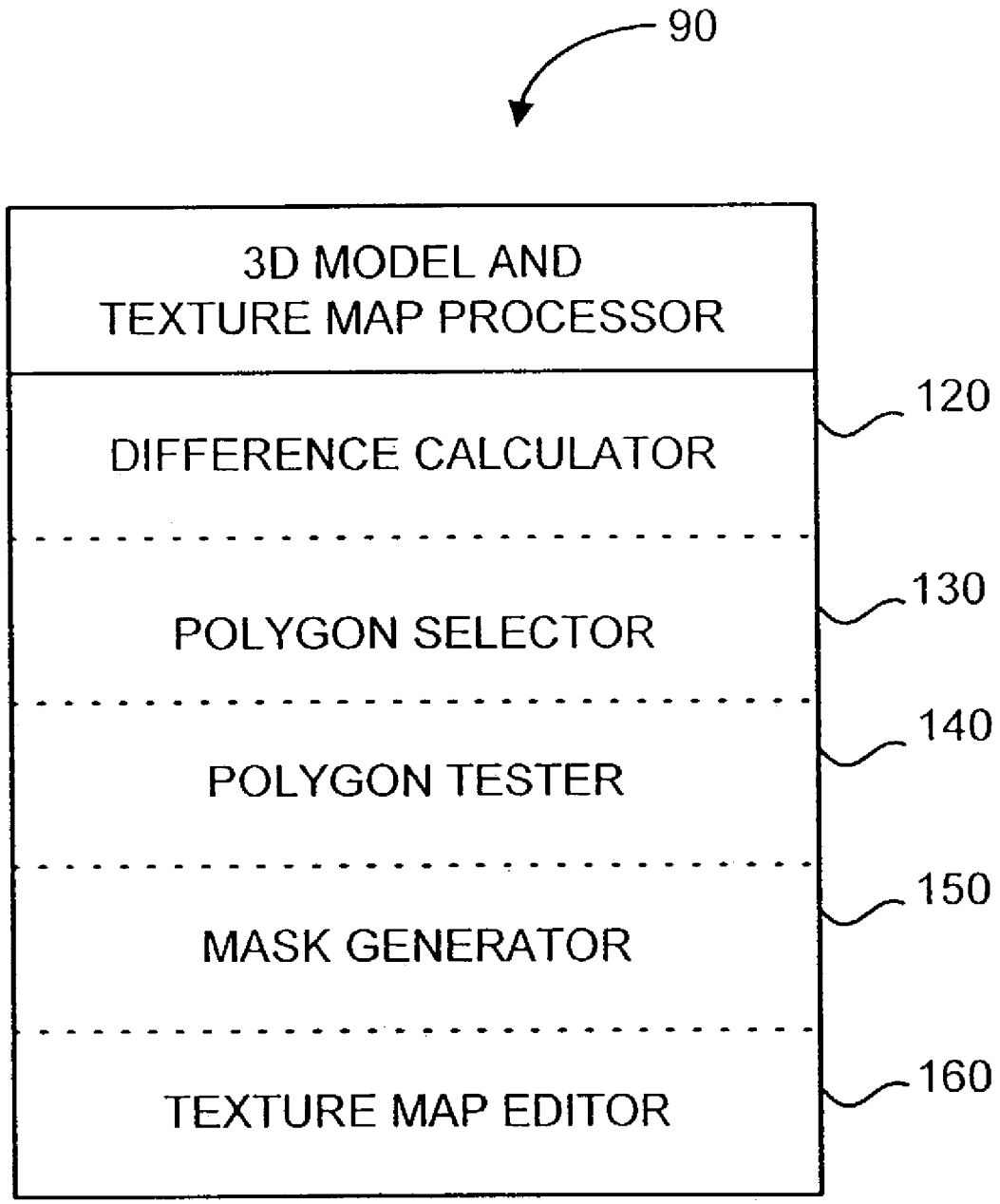

Referring to FIG. 3, in this embodiment, 3D model and texture map processor 90 comprises a difference calculator 120, a polygon selector 130, a polygon tester 140, a mask generator 150 and a texture map editor 160.

Difference calculator 120 is arranged to compare the original image data generated by renderer 60 and stored in image store 100 with the edited image data generated by image editor 80, to generate a difference image therefrom (that is, an image in which pixels having positions corresponding to pixels whose values were changed by image editor 80 are set to value 1, and pixels having positions corresponding to pixels which were unchanged by image editor 80 are set to value 0).

Polygon selector 130 is arranged to determine to which polygons in the polygon mesh 200 representing the 3D computer model the edited image data generated by image editor 80 maps onto.

Polygon tester 140 is arranged to determine, for each polygon identified by polygon selector 130, whether the polygon is sufficiently front-facing with reference to the viewing direction of the image edited by image editor 80 that the edited image data should be used to update the texture map data for the polygon, or whether the polygon is at such an oblique angle with reference to the viewing direction that no changes should be made to the texture map data for the polygon, even though the user made changes to the corresponding image data.

Mask generator 150 is arranged to generate a polygon mask for a given polygon based on the pixels in the difference image generated by difference calculator 120 which apply to the polygon and which represent changed image data.

Texture map editor 160 is arranged to amend the texture data in the texture maps 210, 220, 230 in dependence upon the edited image data generated by image editor 80 and the polygon mask generated by mask generator 150.

Referring again to FIG. 1, output data interface 110 is arranged to output from the apparatus 2 output data defining the edited texture map data generated by 3D model and texture map processor 90 and, optionally data from the 3D model store 40 defining the polygon mesh 200. The data may be output from the apparatus, for example as data on a data storage medium, such as disk 112 and/or as a signal 114. A recording of the output data may be made by recording the output signal 114 either directly or indirectly (for example by making a first recording as a "master" and then making a subsequent recording from the master or from a descendant recording thereof) using recording apparatus (not shown).

Figure 4A:
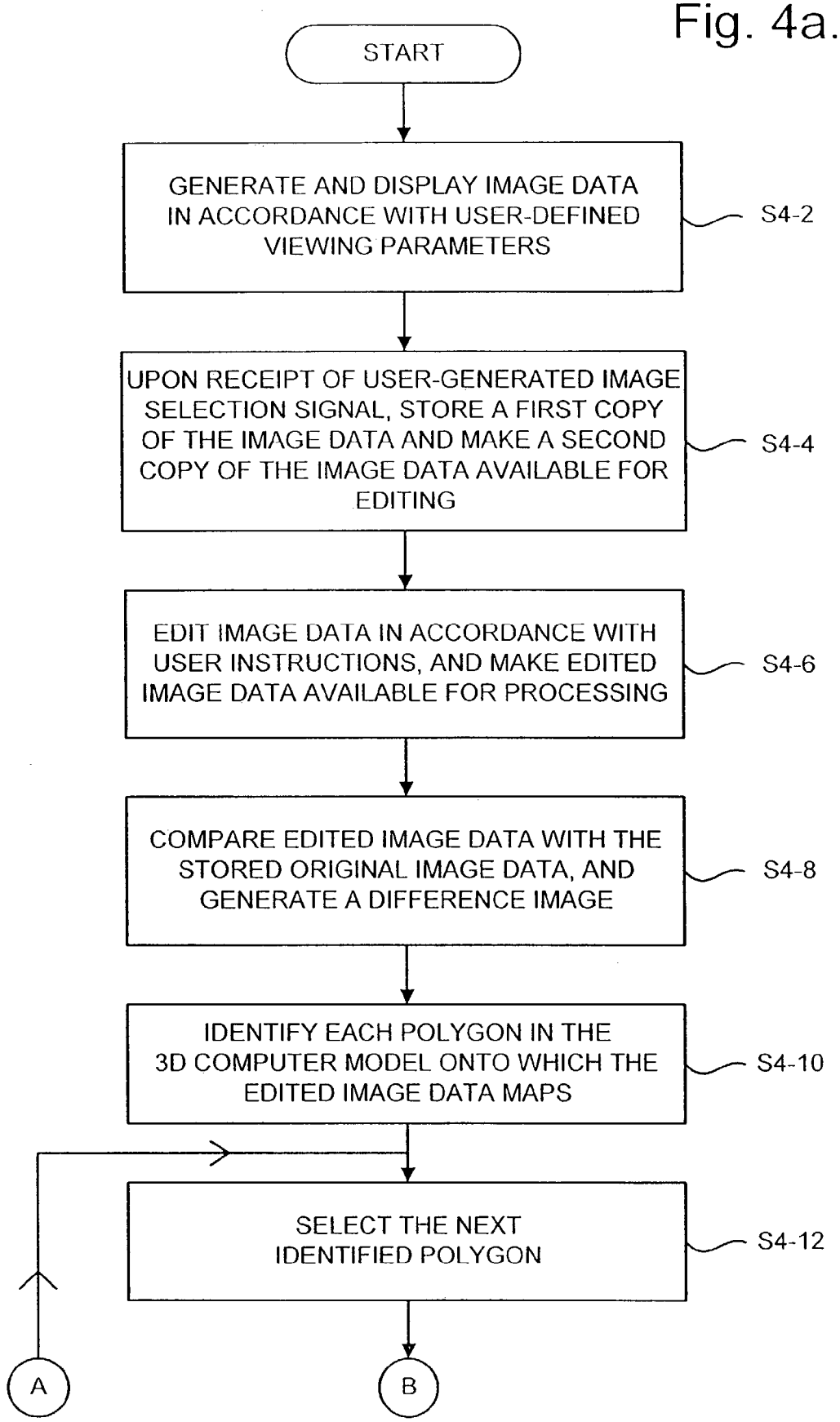
Figure 4B:
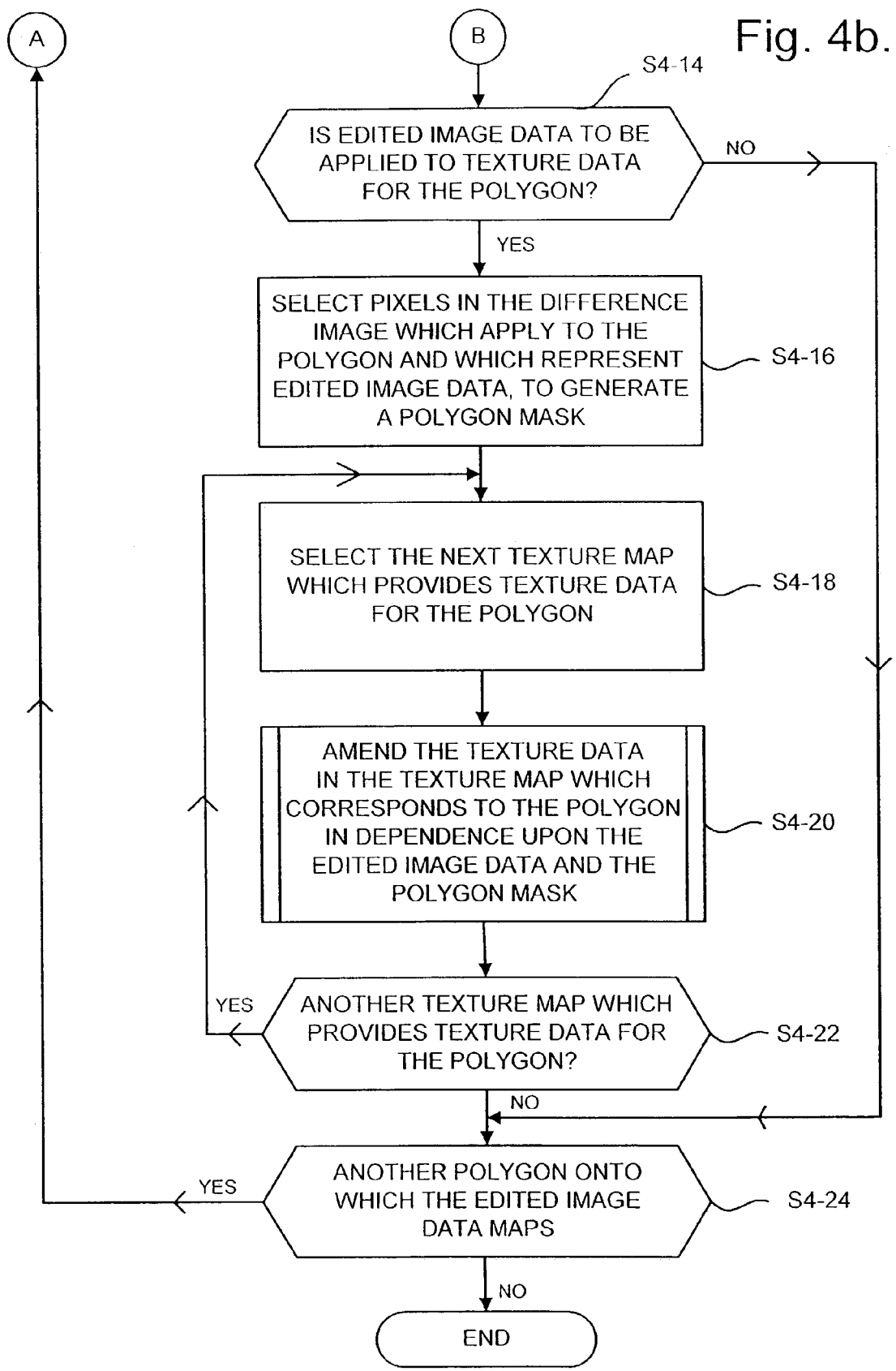

Referring now to FIG. 4, the processing operations performed by the functional components within processing apparatus 2 in this embodiment will be described.

At step S4-2, renderer 60 processes the data defining the polygon mesh 200 stored in 3D model store 40 and the texture data defining the texture maps 210, 220, 230 stored in texture map store 50, to generate an image of the 3D computer model in accordance with a viewing direction relative to the 3D computer model selected by the user using one or more user-input devices 6. This processing is performed in a conventional manner, and accordingly will not be described here.

The image data generated by renderer 60 is displayed on display device 4 by display controller 70.

Referring to FIG. 5, the image data generated by renderer 60 and displayed to the user on display device 4 defines an image 260 of the polygon mesh 200 from a viewing direction V (where V is a unit vector).

The image 260 shows the polygon mesh 200 rendered with texture data from the texture maps 210, 220, 230. Consequently, the user is able to view the effect of the texture data on the 3D computer model from any desired viewing direction V. As will be explained below, the user is then able to edit the image data defining the image 260 and the apparatus automatically changes the corresponding texture data in the texture maps 210, 220, 230.

In this way, the user is not required to view a texture map 210, 220, 230 directly in order to edit the texture data, but instead can view an image of the 3D object rendered with the texture data for editing. The user is then able to view the effect the texture data has on the 3D computer model, and can select the viewing direction giving the best view of the texture data it is described to edit.

Referring again to FIG. 4, at step S4-4, upon receipt of an image-selection signal input by the user using a user-input device 6, central controller 20 stores a first copy of the image data in image store 100. This stored data defines the image displayed on the display device 4 when the image selection signal was generated.

In addition, central controller 20 makes a second copy of the image data available for access by image editor 80. More particularly, because image editor 80 is defined by a separate application in this embodiment, central controller 20 writes the second copy of the image data to a clipboard (or similar shared data storage facility) in a conventional way. In this way, the image data is exported for access by the application defining image editor 80.

At step S4-6, the exported image data is imported into the application defining image editor 80 from the clipboard. This may be carried out, for example, using a conventional "paste" function.

The image data is then edited in accordance with instructions input by the user using one or more user-input devices 6. Changes to the image data are displayed to the user on the display device 4 in real-time as they are made. When the user has finished editing the image data, the edited image data is made available for processing by exporting it from the application defining the image editor 80. Again, this is performed in a conventional manner by saving the image data to the clipboard (or other similar shared storage facility).

At step S4-8, the edited image data is imported into the software application defining the 3D model and texture map processor 90, this processing again being performed in a conventional way by retrieving the image data from the clipboard.

Difference calculator 120 then compares the edited image data generated by image editor 80 with the copy of the original image data generated by renderer 60 which was stored in image store 100 at step S4-4. Based on the comparison, difference calculator 120 generates a difference image having the same number of pixels as the original image, and in which pixels corresponding to pixels whose values have been edited by image editor 80 are set to a value 1, and pixels corresponding to pixels whose values have not been changed by image editor 80 are set to a value 0.

At step S4-10, polygon selector 130 performs processing to identify each polygon in the polygon mesh 200 onto which the edited image data generated at step S4-6 maps.

Figure 6:
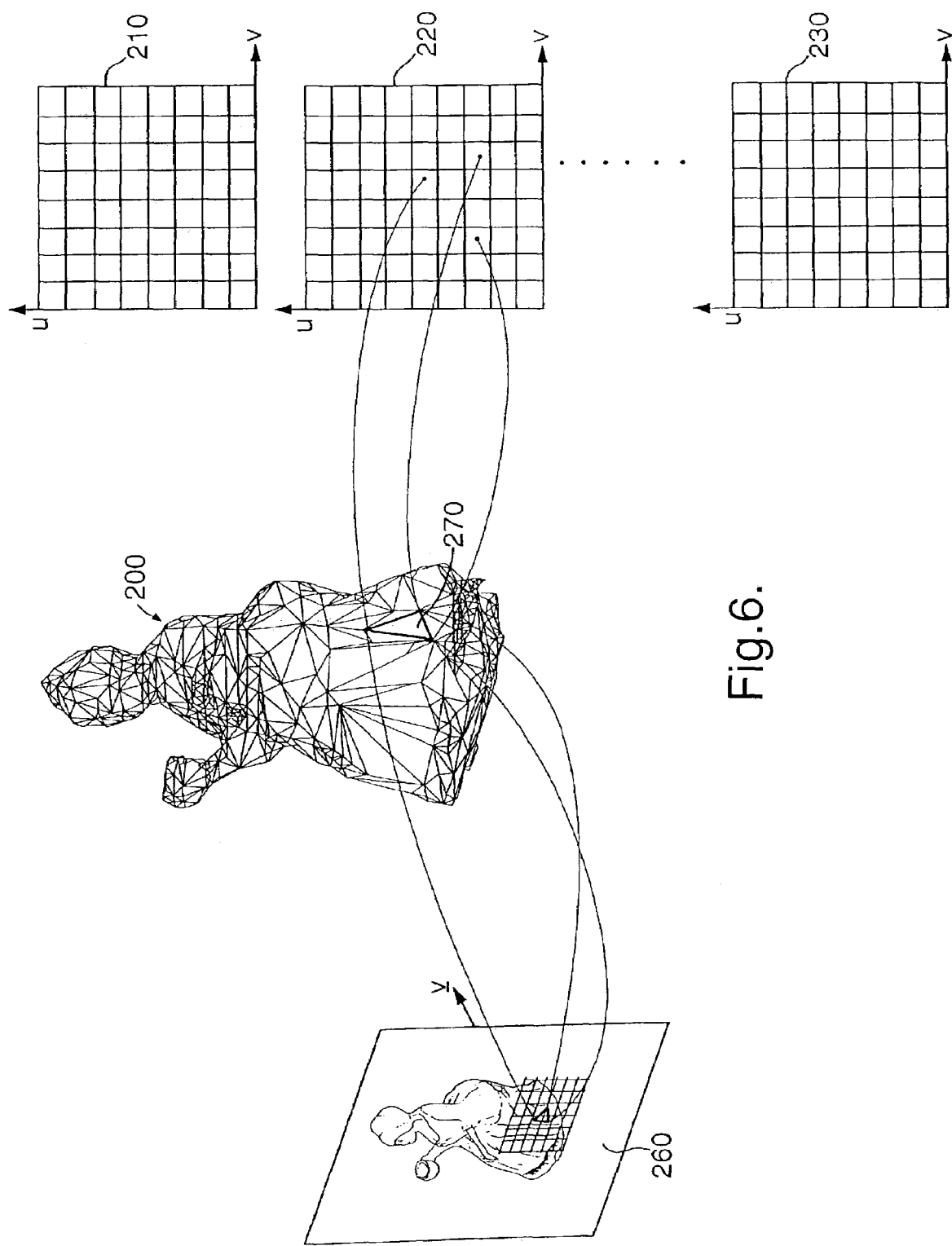
FIG. 6 illustrates how edited image data maps onto a polygon in the 3D computer model.

By way of explanation, referring to FIG. 6, polygons in the polygon mesh 200 map onto pixels in the image 260 displayed to the user and edited at step S4-6. This is illustrated for polygon 270 in FIG. 6.

However, the image 260 shows the surface detail of the 3D computer model generated from the texture data in the texture maps 210, 220, 230 and not the individual polygons in the polygon mesh 200 (with the result that the user edits the image data without reference to the polygons in the polygon mesh 200).

At step S4-10, polygon selector 130 performs processing to determine which polygons in the polygon mesh 200 are contributing texture data to the parts of the image data in image 260 which were modified by the processing at step S4-6. In subsequent processing, the texture data in the texture maps 210, 220, 230 for the identified polygons is amended in dependence upon the changes made to the image data at step S4-6.

In this embodiment, polygon selector 130 carries out the processing at step S4-10 by associating each pixel in the image 260 with a polygon in the polygon mesh 200, and then selecting the polygons in the polygon mesh 200 which are associated with pixels whose values were changed by the processing at step S4-6.

The processing to associate each pixel in the image 260 with a polygon in the polygon mesh 200 is performed in a conventional manner. This processing comprises assigning a unique colour to each polygon in the polygon mesh 200, generating an image of the polygon mesh 200 with identical viewing parameters to the image selected at step S4-4 by performing a conventional rendering process, and assigning each pixel in the generated image to a polygon in the polygon mesh 200 by matching the pixel colour to the colour of a polygon in the polygon mesh 200.

Pixels in the image 260 changed by the processing at step S4-6 are then identified, and a list is made of the corresponding polygons in the polygon mesh 200, to identify polygons for subsequent processing.

At step S4-12, 3D model and texture map processor 90 selects the next polygon identified at step S4-10 for processing (this being the first such polygon the first time step S4-12 is performed).

At step S4-14, polygon tester 140 performs processing to determine whether the edited image data generated at step S4-6 for the polygon selected at step S4-12 is to be used to amend the texture data for the polygon.

Figure 7:
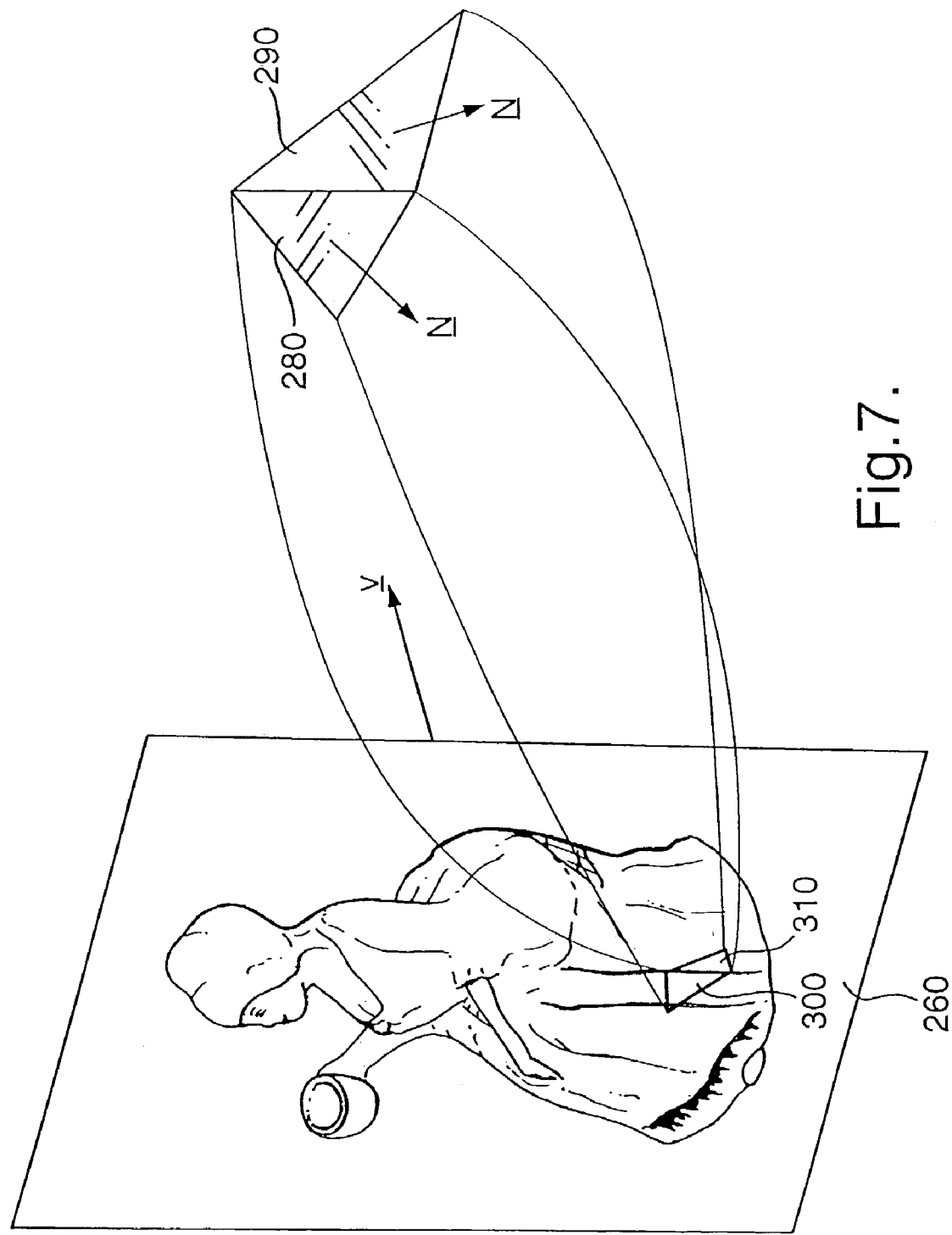
FIG. 7 shows an example to illustrate how changes to a small part of an image can affect large polygon areas in the 3D computer model.

FIG. 7 illustrates an example showing a case where it is appropriate to use the edited image data for a polygon to amend the corresponding texture data in the texture maps 210, 220, 230, and also a case where it is not appropriate to use the edited image data for a polygon to amend the corresponding texture data.

Referring to FIG. 7, two polygons 280, 290 from the polygon mesh 200 are illustrated in enlarged form. Each polygon 280, 290 is a planar polygon and the normal vector N perpendicular to the plane of each polygon is shown.

Polygon 280 projects to a polygon 300 in the image 260 and polygon 290 projects to a polygon 310 in the image 260. As explained previously, the polygons 300 and 310 are not visible in the image 260 and instead only the texture data from the texture map 210, 220, 230 corresponding to the polygons 280, 290 is visible at the positions defined by polygons 300, 310.

The angle between the viewing direction V of the image 260 and the normal vector N of polygon 280 is approaching 180 degrees, with the result that the viewing direction V is substantially perpendicular to the plane of polygon 280. On the other hand, the angle between the viewing direction V and the normal vector N of polygon 290 is much less than 180 degrees, with the result that the plane of polygon 290 is at a more oblique angle to the viewing direction V than the plane of polygon 280.

The effect of this is that, in the image 260, polygon 280 projects to a relatively large number of pixels (defined by polygon 300), but polygon 290 projects to relatively small number of pixels (defined by a polygon 310).

Consequently, any changes to the pixels in the area defined by polygon 310 in the image 260 could result in changes to the texture data for polygon 290 affecting a large part of the polygon 290. While these changes may not be significantly visible in image 260 (because of the small size of polygon 310) the changes may be highly visible in an image from a different viewing direction which is closer to perpendicular to the plane of polygon 290.

In addition, changes to the pixels in the area defined by polygon 310 in image 260 could be made by mistake when the user is editing pixels in an adjacent area (such as pixels within the area defined by polygon 300).

For these reasons, in this embodiment, polygon tester 140 performs processing at step S4-14 to reject polygons which are not sufficiently front-facing to the viewing direction V of image 260. The rejected polygons are then excluded from subsequent processing so that the edited image data generated at step S4-6 is not used to change the texture data in the texture maps 210, 220, 230 corresponding to the rejected polygons.

More particularly, in this embodiment, polygon tester 140 tests the polygon selected at step S4-12 by calculating the dot product (also known as the scalar product) of the viewing direction V of the image 260 (which is a unit vector) with the normal vector N of the polygon (which is also a unit of vector), and comparing the result with a threshold value (which, in this embodiment, is set to the value cos 135°. Thus, polygon tester 140 determines whether the following inequality holds:

$$V \cdot N \leq \cos(135°) \tag{1}$$

If it is found that V·N is greater than cos (135°), then the polygon is rejected and processing proceeds to step S4-24 to consider the next polygon from the list generated at step S4-10. In this way, polygons are rejected if they are back-facing with respect to the viewing direction V or if the plane in which they are lying is at angle of more than 45 degrees to the viewing direction V.

On the other hand, if it is determined at step S4-14 that V·N is less than or equal to cos (135°), then it is determined that the polygon is sufficiently front on to the viewing direction V that the texture data for the polygon in the texture maps 210, 220, 230 should be updated using the edited image data generated at step S4-6. Consequently, in this case, processing proceeds to step S4-16.

At step S4-16, mask generator 150 selects pixels from the difference image generated at step S4-8 which represent edited image data (that is, pixels having the value 1) and which correspond to the polygon currently being processed (such pixels being identifiable as a result of the processing at step S4-10 described above). The selected pixels define a polygon mask for use in subsequent processing.

At step S4-18, 3D model and texture map processor 90 selects the next texture map 210, 220, 230 which provides texture data for the polygon currently being considered (this being the first such texture map the first time step S4-18 is performed).

At step S4-20, texture map editor 160 amends the texture data in the texture map selected at step S4-18 which corresponds to the polygon currently being considered in dependence upon the corresponding edited image data generated at step S4-6 and the polygon mask generated at step S4-16.

Figure 8:
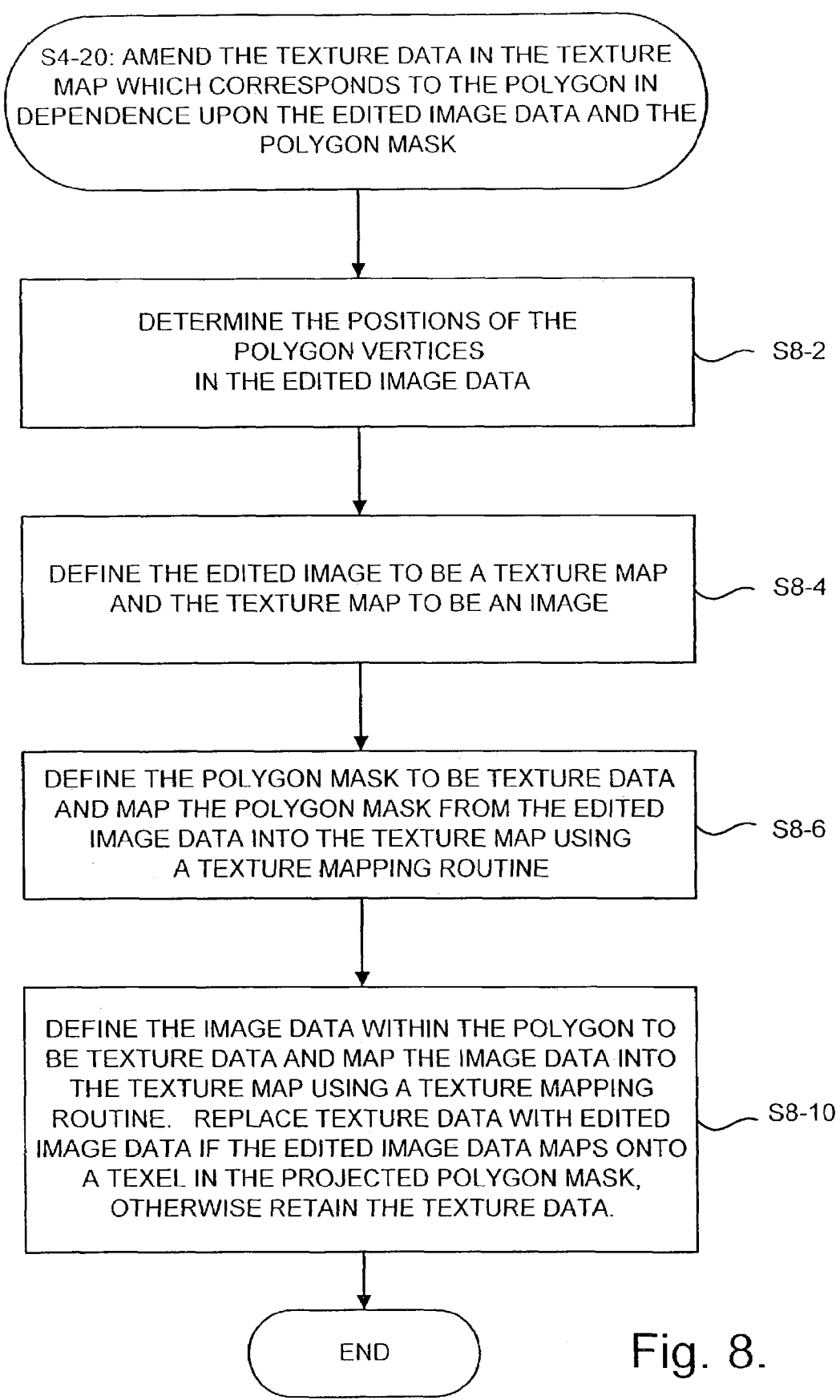
FIG. 8 shows the processing operations performed at step S4-20 in FIG. 4.

FIG. 8 shows the processing operations performed by texture map editor 160 at step S4-20.

Referring to FIG. 8, at step S8-2, texture map editor 160 performs processing to determine the positions in the edited image data generated at step S4-6 of the vertices of the polygon currently being processed. More particularly, in this embodiment, this processing comprises projecting the polygon vertices from the 3D world space of the polygon mesh 200 into the 2D space of the image 260 using the transformation defined by the viewing parameters in accordance with which the image 260 was originally generated by renderer 60.

At steps S8-4 to S8-10, texture map editor 160 amends the texture data in the texture map currently being processed using the edited image data from the image 260 which lies between the vertex positions calculated at step S8-2.

In this embodiment, this processing is carried out by performing a conventional texture mapping operation, but in a reverse direction—that is, from the image 260 into the texture map rather than from the texture map into the image 260.

More particularly, at step S8-4, texture map editor 160 defines the image 260 to be a texture map and the texture map selected at step S4-18 to be an image.

Figure 9:
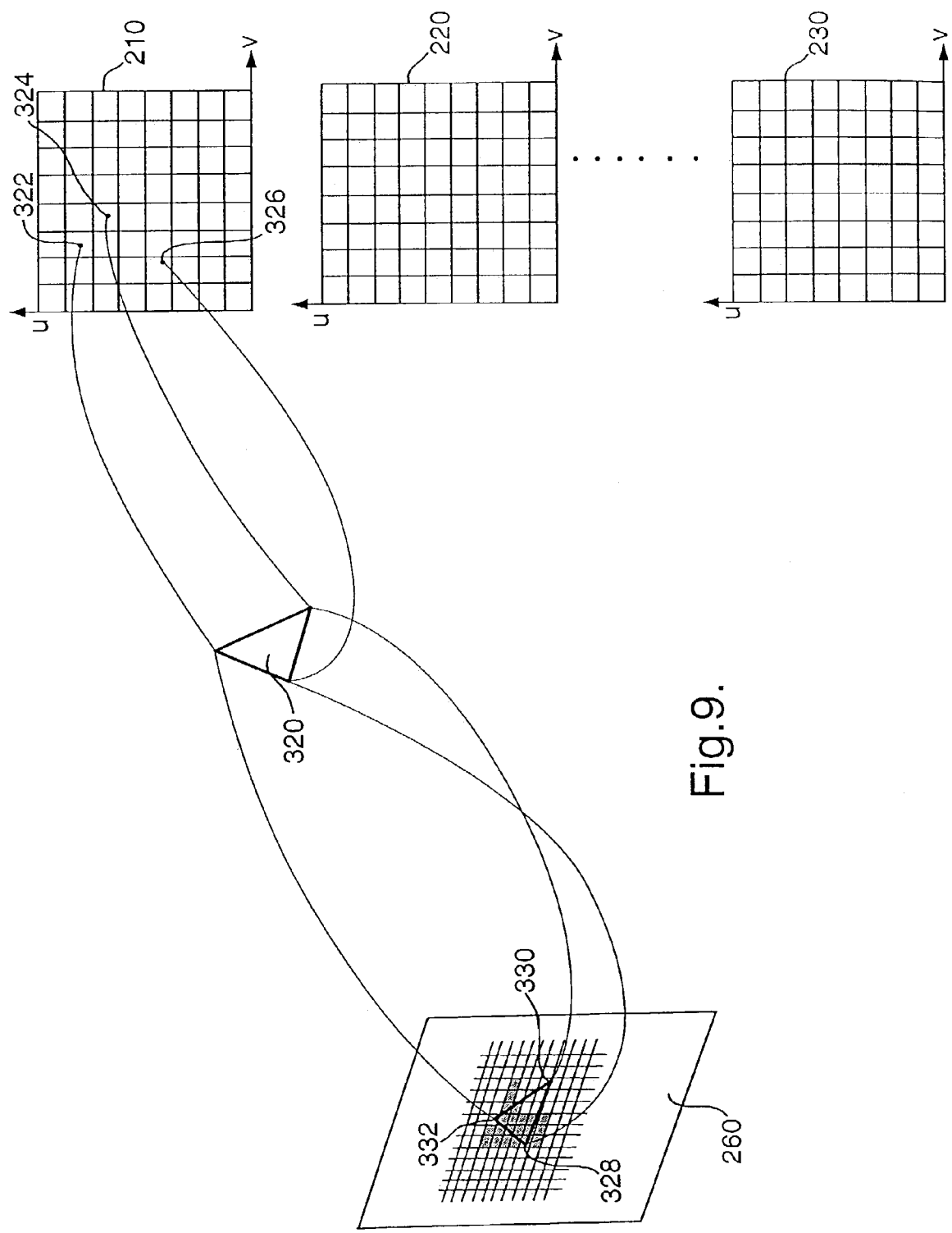
FIG. 9 illustrates the mapping of edited image data into a texture map to change the texture map data at step S4-20 in FIG. 4.

Thus, referring to FIG. 9, pixel data in the image 260 now defines data to be mapped into the texture map 210 to update the texture data therein at the appropriate positions. FIG. 9 illustrates this for a polygon 320 in the polygon mesh 200, which is shown in enlarged form.

The texture data to be amended in texture map 210 comprises texture data lying between the vertex positions 322, 324, 326 of triangle 320 (these positions being defined by the data stored in 3D model store 40 and texture map store 50 in a conventional way) onto which image data lying between the vertex positions 328, 330, 332 of triangle 320 in image 260 and amended by the processing at step S4-6 maps (the vertex positions 328, 330, 332 having been calculated at step S8-2).

To carry out the amendment of the correct data in texture map 210, at step S8-6, texture map editor 160 defines the polygon mask generated at step S4-16 to be texture data and maps this polygon mask texture data from the image 260 (now defined to be a texture map) into the texture map 210 (now defined to be the image). This mapping is carried out using a conventional texture mapping routine, defining the polygon defined by vertices 322, 324 and 326 to be the recipient polygon for the transformed texture data.

Texture map editor 160 stores a record of the texels in the texture map 210 onto which the polygon mask texture maps.

At step S8-10, texture map editor 160 defines the image data for all of the pixels lying between the vertex positions 328, 330, 332 calculated at step S8-2 to be texture data, and maps the data from the image 260 (now defined to be a texture map) into the texture map 210 (now defined to be an image) using a conventional texture mapping routine, defining the polygon defined by vertices 322, 324, and 326 to be the recipient polygon for the transformed texture data. Thus, all of the image data in the area defined by vertices 328, 330 and 332 is mapped into the texture map 210, irrespective of whether or not the image data was amended by the processing at step S4-6.

Texture map editor 160 replaces the texture data already existing in texture map 210 with the image data mapped into the texture map at step S8-6 if the image data maps onto to a texel within the projected polygon mask (determined at step S8-6), but retains the original texture data in the texture map 210 if the image data maps onto a texel outside the polygon mask.

In this way, because the polygon mask defines the parts of the image data amended at step S4-6, the texture data in the texture map 210 is changed by amended image data, but is not changed by unamended image data.

Referring again to FIG. 4, at step S4-22, 3D model and texture map processor 90 determines whether there is another texture map 210, 220, 230 which provides texture data for the polygon currently being processed. Steps S4-18 to S4-22 are repeated until all of the texture maps providing data for the polygon selected at step S4-12 have been processed in the way described above.

At step S4-24, 3D model and texture map processor 90 determines whether there is another polygon onto which the edited image data generated at step S4-6 projects, (that is, whether there is another polygon on the list generated at step S4-10).

Steps S4-12 to S4-24 are repeated until each polygon onto which the edited image data maps has been processed in the way described above.

As a result of this processing, the texture data defined in the texture maps 210, 220, 230 is amended based on the changes to the image 260 made by the user. Consequently, the user is able to edit the texture data by making changes to an image of the 3D computer model from any selected direction.

Many modifications can be made to the embodiment described above within the scope of the claims.

For example, in the embodiment above, image editor 80 is defined by a separate software application, that is an application separate from the application defining renderer 60 and 3D model and texture map processor 90. However, instead, renderer 60 image editor 80 and 3D model and texture map processor 90 may be defined by the same application, as may one or more of the other functional units shown in FIG. 1 and described above.

In the embodiment described above, image data is generated at step S4-2 in accordance with a user-selected viewing direction of the 3D computer model. In addition, the user may select other viewing parameters for the image, such as viewing position, camera zoom etc.

In the embodiment above, processing is performed at step S4-14 to test each polygon on the list generated at step S4-10 to determine whether edited image data is to be used to change the texture data for the polygon. More particularly, no amendment is made to the texture data for a polygon if the test at step S4-14 determines that the plane of the polygon is not sufficiently front-facing with respect to the viewing direction V of the image 260 from which the edited image data was generated. However, step S4-14 is not essential, and may be omitted, with the result that all of the polygons identified at step S4-10 are processed using the processing at steps S4-16 to S4-22.

In the embodiment above, processing is performed at steps S4-8 and S4-10 to distinguish image data which has been edited by the user from unedited image data, and to identify the polygons in the 3D computer model onto which the edited image data maps. In subsequent processing, the texture data for polygons is amended in dependence upon the edited image data but not in dependence upon any unedited image data. However, the processing at steps S4-8 and S4-10 is not essential, and may be omitted. In subsequent processing, every polygon in the 3D computer model may be tested at step S4-14 to determine whether the texture data for the polygon is to be amended and, for each polygon from which the texture data is to be amended, the texture data may be amended in dependence upon all of the image data relating to the polygon—that is, both edited image data and unedited image data for the polygon.

In the embodiment described above, the test at step S4-14 to determine whether a polygon is sufficiently front-facing with respect to the viewing direction V of image 260 that the edited image data should be applied to the texture data for the polygon is carried out in accordance with equation (1) above. However, other tests could be used in addition or instead. For example, processing may be carried out to determine whether the following inequality holds:

$$\frac{\text{Area of projected polygon in image}}{\text{Area of polygon in 3D space of polygonmesh}} \geq \text{Threshold} \quad (2)$$

where the area of the projected polygon in the image 260 is measured in pixels and the area of the polygon in the 3D space of the polygon mesh 200 (that is, in world space) is measured in arbitrary, predefined units.

If it is determined that the inequality does hold (that is, that the area ratio is greater than or equal to the threshold), then processing would proceed through steps S4-16 to S4-22 to amend the texture data for the polygon, otherwise these steps would be omitted.

Similarly, the following inequality may be evaluated at step S4-14 in addition to, or instead of equation (1) above:

$$\frac{\text{Area of projected polygon in image}}{\text{Area of projected polygon in texture map}} \geq \text{Threshold} \quad (3)$$

where the area of the projected polygon in image 260 is measured in pixels, and the area of the corresponding projected polygon in a texture map 210, 220, 230 is measured in texels.

If it is determined that the area ratio is greater than or equal to the threshold in equation (3), then steps S4-16 to S4-22 would be carried out to amend the texture data in dependence upon the edited image data. Otherwise, these steps would be omitted.

In both equations (2) and (3) above, the area ratio is representative of the relative orientation of the polygon and the viewing direction V of image 260. This is because the area of the projected polygon in image 260 (the numerator) is dependent upon the angle the polygon makes with the viewing direction V of the image 260, while the denominator represents an orientation-independent area of the polygon.

In the embodiment described above, and in the modifications using equations (2) and (3) above, the processing at step S4-14 results in a polygon being retained for processing at steps S4-16 to S4-22 or rejected. However, instead, processing may be carried out at S4-14 to calculate a measure of the relative orientation of the polygon and the viewing direction V in accordance with one or more of equations (1) to (3) but not to reject any polygons from subsequent processing (or to reject only back-facing polygons). The processing at step S8-10 would then be changed so that, instead of replacing each texel value to be changed with the corresponding image value, the texel value is replaced with a value dependent upon the calculated relative orientation of the polygon and the viewing direction V. For example, each texel value to be changed could be replaced with a weighted average of the original texel value and the corresponding image value, with relative weightings determined in accordance with the calculated orientation measure (the weightings being set to increase the contribution of the image value as the plane of the polygon becomes more front-facing to the viewing direction V, and to increase the contribution of the original texel value as the plane of the polygon becomes less front-facing to the viewing direction V).

In the embodiment described above, processing is performed by a computer using processing routing defined by programming instructions. However, some, or all, of the processing could be performed using hardware.

The invention claimed is:

1. A method of editing texture for a three-dimensional computer model of an object, the model comprising data defining a plurality of polygons and associated texture data stored in one or more texture maps, the method comprising:
   a computer executing the following steps:
   generating image data representing an image of the object rendered with the texture data in accordance with a user selected viewing direction;
   editing the image based on user input so as to generate modified image data representing a modified image of said object from said viewing direction;
   utilizing the user selected viewing direction and the data defining a plurality of polygons to select portions of texture data to be updated and to identify portions of the modified image data to be utilized to generate user modified texture data;
   generating user modified texture data by modifying the selected portions of texture data utilizing the identified portions of the modified image data; and
   storing the user modified texture data in one or more texture maps,
   herein,
   polygons from the three-dimensional computer model are tested to determine a measure of the respective orientation of each polygon relative to the user selected viewing direction,
   in the processing to generate the user modified texture data, the texture data is modified in dependence upon the determined orientation measures and in dependence upon the generated modified image data; and
   each texture data value to be modified is modified by replacing it with a value comprising a combination of the original texture data value and a generated modified image data value, the relative contributions of the original texture data value and the generated modified image data value being determined in dependence upon the calculated orientation measure of the corresponding polygon.

2. A method according to claim 1, wherein, in the processing to generate the user modified texture data, texture data in a plurality of texture maps is modified in dependence upon the generated modified image data from a single image.

3. A method according to claim 1, further comprising generating a signal conveying the user modified texture data.

4. A method according to claim 3, further comprising making a recording of the signal either directly or indirectly.

5. Method according to claim 1, wherein 2-dimensional image data is generated in said generating step, and modified 2-dimensional image data is generated in said editing step.

6. A method according to claim 5, wherein:
   the generated modified 2-dimensional image data is compared with unamended 2-dimensional image data to determine which image data has been changed in the editing process; and
   the user modified texture data is generated in dependence upon the image data determined to have changed but not in dependence upon unchanged image data.

7. A method according to claim 6, wherein the process to generate the user modified texture data comprises:
   determining to which polygons in the three-dimensional computer model the changed image data relates; and
   modifying the texture data for the polygons to which the changed image data relates in dependence upon the changed image data.

8. A method according to claim 7, wherein the processing to modify the texture data for the polygons to which the changed image data relates comprises:
   generating data defining a respective polygon mask for each polygon to which the changed image data relates, each polygon mask defining which parts of the polygon relate to changed image data and which parts relate to unchanged image data; and
   modifying the texture data for each polygon to which the changed image data relates in dependence upon the polygon mask and the changed image data for the polygon.

9. A method according to claim 8, wherein:
   each polygon mask is defined in the co-ordinate system of the image data; and
   the processing to modify the texture data for a polygon to which the changed image data relates comprises:

mapping the changed and unchanged image data for the polygon and the polygon mask for the polygon into the texture data;

identifying from the projected polygon mask which texture data relates to changed image data; and changing the identified texture data in dependence upon the changed image data.

10. A method according to claim 5, wherein:

the generated modified 2-dimensional image data is compared with unmodified 2-dimensional image data to determine which image data has been changed in the editing process; and the user modified texture data is generated in dependence upon the image data determined to have changed but not in dependence upon unchanged image data by:

determining to which polygons in the three-dimensional computer model the changed image data relates; and modifying the texture data for the polygons to which the changed image data relates in dependence upon the changed image data; and the polygons tested to determine the orientations thereof comprise the polygons to which the changed image data relates, but not polygons to which the changed image data does not relate.

11. A method according to claim 5, wherein:

generated 2-dimensional image data representing an image of the object rendered with the texture data in accordance with a user selected viewing direction is exported from a first software application running on the processing apparatus;

the exported 2-dimensional image data is imported by a second software application running on the processing apparatus, and the processing to generate the generated modified 2-dimensional image data is performed by the second software application; and the generated modified image data is exported from the second software application and imported into the first software application for subsequent processing.

12. A method according to claim 1, wherein, in the processing to modify the texture data:

polygons for which the texture data may be modified are selected in dependence upon the determined orientation measures; and the texture data is modified only for the selected polygons.

13. A method according to claim 12, wherein a polygon is selected as a polygon for which the texture data may be amended if the orientation measure indicates that the plane in which the polygon lies is within a predetermined angle of being perpendicular to the user selected viewing direction.

14. A method according to claim 1, wherein the respective orientation measure for each polygon is determined based on the angle between a normal vector to the polygon surface and the user selected viewing direction.

15. A method according to claim 1, wherein the respective orientation measure for each polygon is determined based on a size of the polygon in the generated image data.

16. A method according to claim 15, wherein the respective orientation measure for each polygon is determined in further dependence upon a size of the polygon in the three-dimensional computer model or a size of the polygon in the texture data.

17. Apparatus for processing data defining a three-dimensional computer model of an object, the model comprising a plurality of polygons and associated texture data stored in one or more texture maps, to amend the texture data based on user input, the apparatus comprising:

an image generator operable to generate image data for display defining an image of the object rendered with said texture data in accordance with a user-selected viewing direction;

an image data editor operable to edit image data to provide image data representing user modified texture data, based on user input and to output the image data for display to the user;

a texture data editor responsive to user input indicating that the user has finished editing the image data, the texture data editor being operable to convert the edited image data into user modified texture data;

a data store for storing the user modified texture data in one or more texture maps; and an orientation measure generator operable to test polygons from the three-dimensional computer model to determine a measure of the respective orientation of each polygon relative to the user selected viewing direction;

wherein the texture data editor is arranged to generate the user modified texture data in dependence upon the determined orientation measures and in dependence upon the generated modified image data; and said texture data editor is further arranged to modify each texture data value to be modified by replacing it with a value comprising a combination of the original texture data value and a generated modified image data value, the relative contributions of the original texture data value and the generated modified image data value being determined in dependence upon the calculated orientation measure of the corresponding polygon.

18. Apparatus according to claim 17, wherein the texture data editor is operable to modify the texture data in a plurality of texture maps in dependence upon the generated modified image data from a single image.

19. Apparatus according to claim 17, wherein 2-dimensional image data is generated by said image generator, and modified 2-dimensional image data is generated by said image data editor.

20. Apparatus according to claim 19, further comprising an image data comparer operable to compare the modified 2-dimensional image data with unmodified 2-dimensional image data to determine which image data has been changed by the 2-dimensional image data editor;

and wherein:

the texture data editor is arranged to generate the user modified texture data in dependence upon the changed image data but not in dependence upon unchanged image data by:

determining to which polygons in the three-dimensional computer model the changed image data relates; and modifying the texture data for the polygons to which the changed image data relates in dependence upon the changed image data; and the orientation measure generator is arranged to determine the orientations of the polygons to which the changed image data relates, but not polygons to which the changed image data does not relate.

21. Apparatus according to claim 20, wherein the texture data editor is arranged to:

generate data defining a respective polygon mask for each polygon to which the changed image data relates, each polygon mask defining which parts of the polygon relate to changed image data and which parts relate to unchanged image data;

define each polygon mask in the co-ordinate system of the image data; and modify the texture data for a polygon to which the changed image data relates by:
mapping the changed and unchanged image data for the polygon and the polygon mask for the polygon into the texture data;
identifying from the projected polygon mask which texture data relates to changed image data; and
changing the identified texture data in dependence upon the changed image data.

22. Apparatus according to claim 19, wherein the apparatus has installed therein first and second software applications and wherein the apparatus is arranged, in use, to:
export the 2-dimensional image data defining an image of the object rendered with said texture data in accordance with a user-selected viewing direction from the first software application;
import the exported 2-dimensional image data into the second software application and perform the processing to generate the generated modified 2-dimensional image data using the second software application;
export the generated modified 2-dimensional image data from the second software application; and
import the exported generated modified 2-dimensional image data into the first software application for subsequent processing.

23. Apparatus according to claim 17, wherein the texture data editor is affanged to generate the user modified texture data by:
selecting polygons for which the texture data may be modified in dependence upon the determined orientation measures; and
modify the texture data only for the selected polygons.

24. Apparatus according to claim 23, wherein the texture data editor is arranged to select a polygon as a polygon for which the texture data may be modified if the orientation measure indicates that the plane in which the polygon lies is within a predetermined angle of being perpendicular to the viewing direction.

25. Apparatus according to claim 17, wherein the orientation measure generator is arranged to determine a respective orientation measure for each polygon based on the angle between a normal vector to the polygon surface and the viewing direction.

26. Apparatus according to claim 17, wherein the orientation measure generator is arranged to determine a respective orientation measure for each polygon based on a size of the polygon in the generated image data defining an image of the object rendered with said texture data in accordance with the user-selected viewing direction.

27. Apparatus according to claim 26, wherein the orientation measure generator is arranged to determine the respective orientation measure for each polygon in further dependence upon a size of the polygon in the three-dimensional computer model or a size of the polygon in the texture data.

* * * * *